Nov. 28, 1939.    J. RUMPF    2,181,742
VEHICLE HEATING SYSTEM
Filed May 17, 1937    2 Sheets-Sheet 1
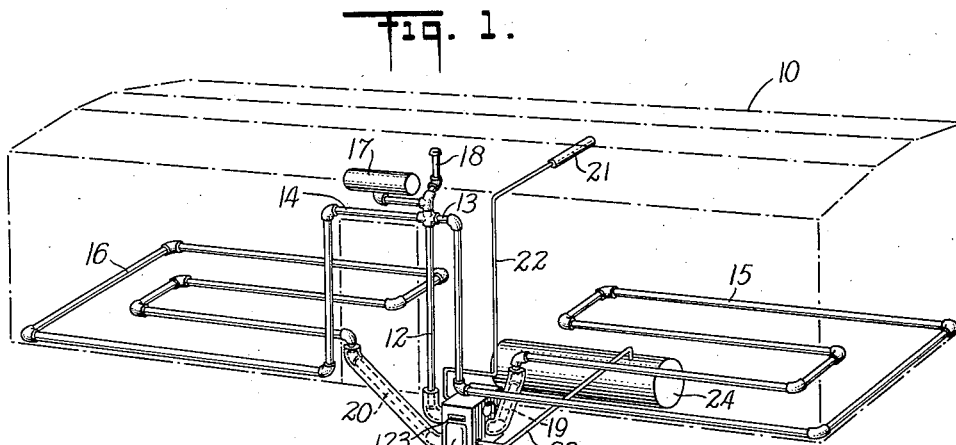
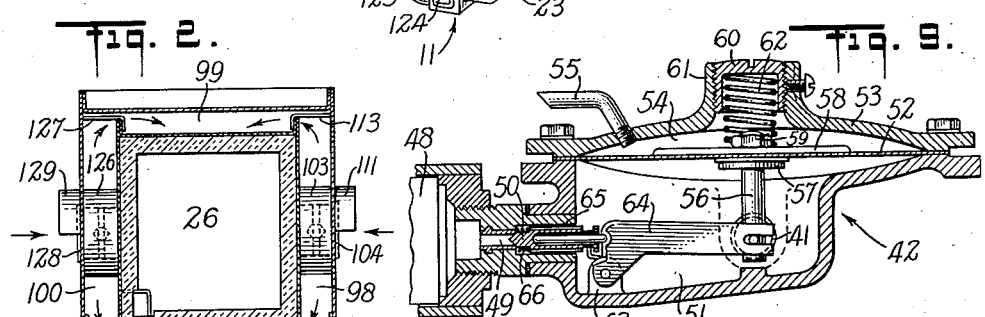
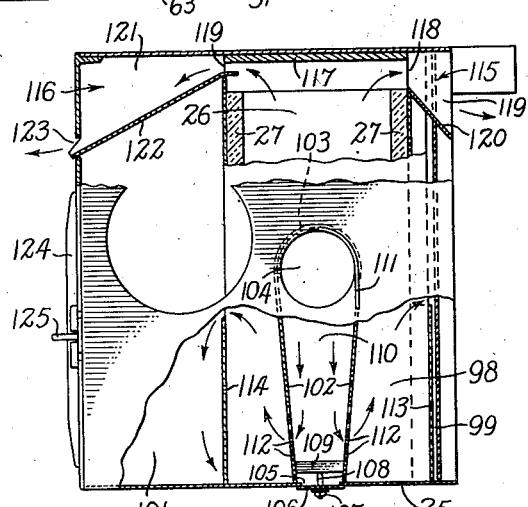
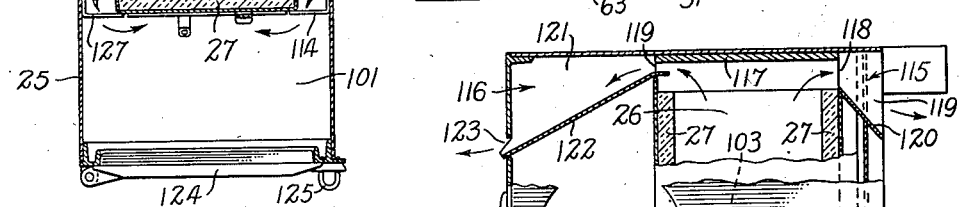
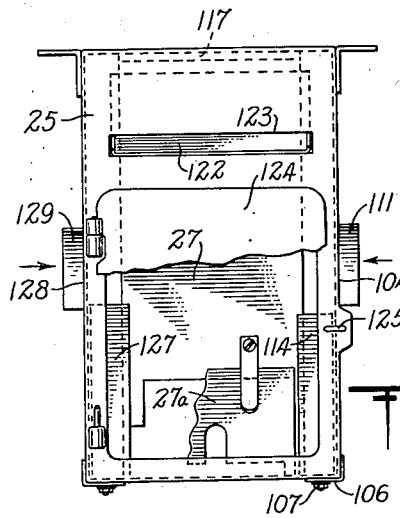
INVENTOR
*John Rumpf*
BY
*Blair, Curtis, Dunne & Hayward*
ATTORNEYS

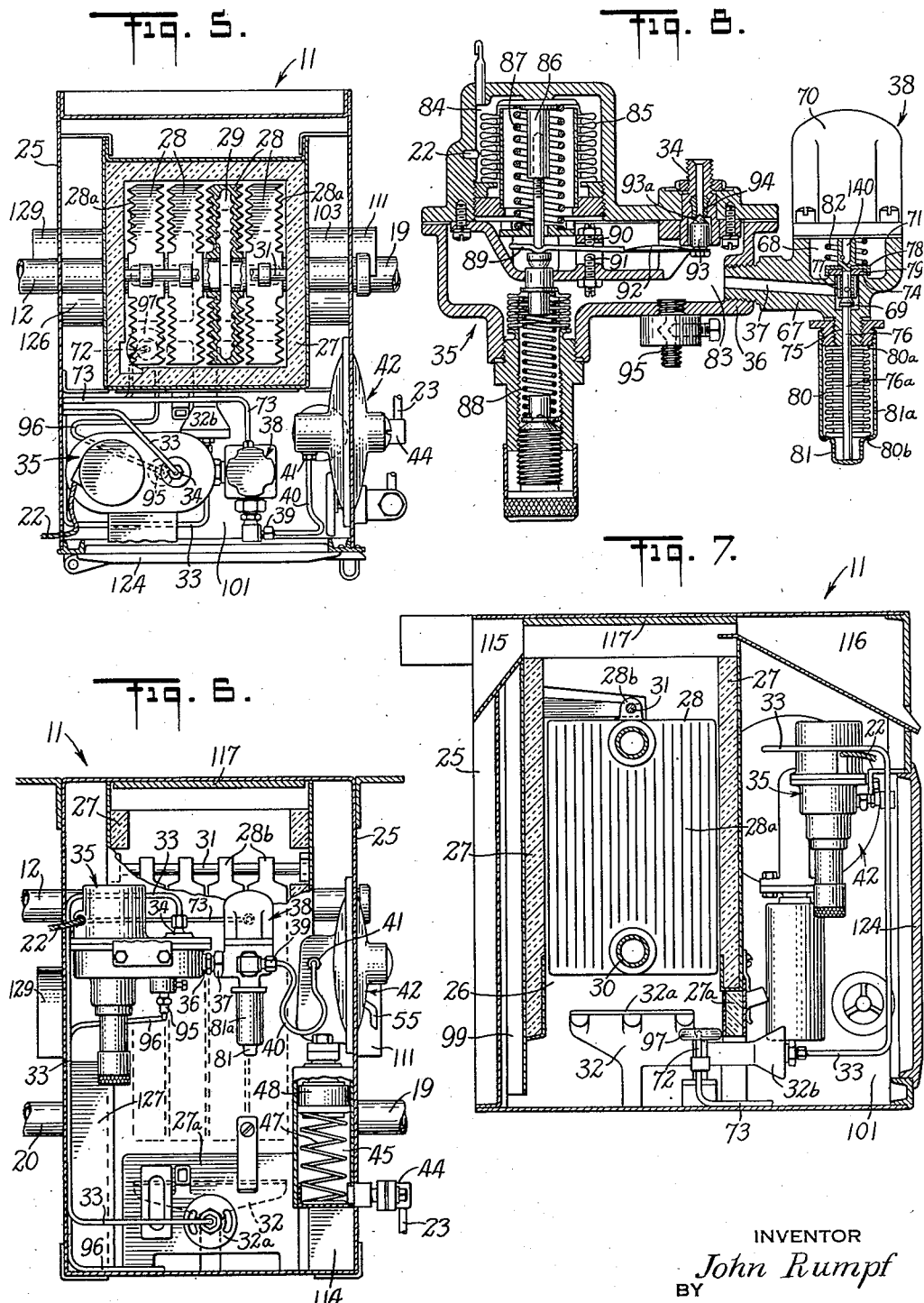

Patented Nov. 28, 1939

2,181,742

UNITED STATES PATENT OFFICE 2,181,742

VEHICLE HEATING SYSTEM

John Rumpf, New Milford, N. J., assignor to The Safety Car Heating & Lighting Company, a corporation of New Jersey Application May 17, 1937, Serial No. 143,005

3 Claims. (Cl. 126—56)

This invention relates to a heating system for a railroad car or the like, and more particularly to a heater for such a system.

Many foodstuffs must be protected from temperature extremes, particularly temperatures near and below freezing during their transportation from farm to market. It has been a somewhat common expedient to fill the ice bunkers of a refrigerator car with glowing charcoal to maintain the desired temperature within the car. This, however, is unsatisfactory because the car is not properly constructed to diffuse the heat from the charcoal, because the charcoal soon burns out, and because of the danger of fire. The use of charcoal in ice bunkers is further characterized by a dangerous concentration of carbon monoxide in the car and localized heating in the upper portion only thereof. Other heating systems fill valuable cargo storage space and in so doing become inaccessible when the car is filled. Many heating devices are characterized by heater units, operation of which over extended periods of time is not always attainable because of lack of fuel storage space and, where a gaseous fuel is used, because the moving car encounters and causes turbulent air currents which not only cause uneven burning of the heater, but often extinguish the flame in the heater. A further difficulty encountered in other heaters lies in ventilation thereof in such a manner as not only to prevent extinguishment of the flame in the heater and provide a steady ample drought, but also to safeguard the car from catching fire from hot exhaust gases.

It is accordingly an object of this invention to provide a heating system for a freight car or similar vehicle, which utilizes a minimum amount of space in the car and by which an even temperature of desired value can be inexpensively maintained throughout the car. It is a further object of this invention to provide a heater for such a heating system which operates dependably and efficiently, which may be easily installed, which is readily accessible for repair or adjustment, and which is thoroughly reliable under conditions of rigorous and extended continuous use. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of my invention, Figure 1 is a diagrammatic perspective view of a railroad car having my heating system installed therein;

Figures 2, 3 and 4 comprise an orthographic projection partly in section showing the air circulating path in the heater;

Figures 5, 6 and 7 comprise an orthographic projection partly in section showing the various operating parts of the heater;

Figure 8 is an enlarged sectional elevation of the control unit in the heater; and, Figure 9 is a sectional elevation of the pressure regulating valve used in the heater.

Similar reference characters refer to similar parts throughout the several views of the drawings.

Referring first to Figure 1, a freight car 10 has secured to the bottom and intermediate the ends thereof a heater generally indicated at 11. As will be more fully pointed out below, heater 11 heats water or another suitable medium which flows from the heater by way of a riser pipe 12 to branch pipes 13 and 14 which are respectively connected with a pair of radiator systems 15 and 16 disposed in the floor of car 10. A closed expansion tank 17 and a filler pipe 18 are connected to riser 12 and radiators 15 and 16 are connected to heater 11 by return pipes 19 and 20 respectively. Preferably all portions of riser 12 and return pipes 19 and 20 which lie below the bottom of car 10 are protected by suitable insulating jackets. It may accordingly be seen that the heating system comprises a thermo-syphonic system, the operation of which is well known.

A thermostat 21 is positioned preferably centrally in the upper part of car 10 and is connected to heater 11 by a pipe 22, heater 11 also being connected by means of a pipe 23 to a fuel tank 24 supported on the under side of car 10. Thus, according to the dictates of thermostat 21, hot water rises through riser pipe 12 and then branches into radiator systems 15 and 16 by way of branches 13 and 14 respectively. As the water circulates through the radiator systems and is cooled therein, it returns by gravity to the heater by way of return pipes 19 and 20.

As is shown in Figures 5, 6 and 7, heater 11 comprises a casing 25 (Figure 5) in which is disposed an enclosure 26 formed by vertical partition walls 27 of suitable heat insulating material. A plurality of water heaters 28 (see also Figure 7) are suspended within enclosure 26 by means of a rod 31 (Figure 6) which extends through lugs 28b formed on heaters 28 and is suitably secured to the sides of enclosure 26. As is better shown in Figures 5 and 6, heaters 28 are connected to one another and to riser pipe 12. Referring to Figure 5, each of heaters 28 has corrugated side portions 28a which are spaced from one another and enclose water chambers 29 through which water circulates as it heats. Heaters 28 are also connected together at their bottom portions by a suitable fixture 30 (Figure 7) which has its opposite ends connected to return pipes 19 and 20 (Figure 6). Thus the return water flows into the bottom of the heater, and upon being heated rises therethrough to riser pipe 12 for circulation through the heating system in car 10.

A gas burner 32 (Figure 7) is mounted in the lower part of casing 25 with its heating portion 32a in the lower portion of heater enclosure 26 under heaters 28, the nozzle 32b of burner 32 extending through a removable door 27a in wall 27 and being connected to one end of a feed line 33, the other end of which is connected to the outlet end 34 (see Figures 5 and 6) of a control valve generally indicated at 35. The inlet end 36 of control valve 35 is connected to the outlet end 37 of an automatic shut-off valve generally indicated at 38, whose inlet end 39 is connected by a pipe 40 to the outlet end 41 of a pressure regulating valve generally indicated at 42. Fuel pipe 23 connects the inlet end 44 of pressure valve 42 with fuel supply tank 24 (Figure 1) which is preferably filled with a liquified gas evaporation of which maintains a substantially constant pressure head in the fuel tank.

As shown in Figures 6 and 9, reducing valve 42 includes filter chamber 45 (Figure 6) in which a spring 47 maintains a liquid filter 48 in proper operative position. With reference to Figure 9, the gas, after flowing through filter 48, passes through inlet 49 past a needle valve 50, thence into a chamber 51 formed in the valve, and flows out of chamber 51 through outlet port 41 (see Figures 5 and 6). The upper portion of chamber 51 (Figure 9) is closed by a flexible diaphragm 52 which is held in place by a cover plate 53 suitably bolted to chamber 51, cover plate 53 forming with diaphragm 52 a chamber 54 open to the atmosphere by way of a vent 55. A stem 56 extends through and is secured to diaphragm 52 by opposed plates 57 and 58 which are held together by a nut 59. An adjustable cap 60 is threaded into a boss 61 formed on cover plate 53, nut 59 being hollowed to receive a spring 62 which bears against diaphragm plate 58 and constantly forces the diaphragm and stem 56 downwardly as viewed in Figure 9.

Chamber 51 is provided with a lug 63 which pivotally mounts an arm 64, one end of which is pivotally related to stem 56 and the other end of which is operatively associated with needle valve 50. Needle valve 50 is mounted to reciprocate in a bore 65, and a spring 66 disposed in this bore constantly urges needle valve 50 against lever 64. It may now be seen that the downward bias of spring 62 acting through stem 56 tends to pivot lever 64 in a clockwise direction to swing the lever away from the end of needle valve 50. When this occurs spring 66 urges the needle valve out of inlet 49 and permits a flow of gas therethrough. However, if the pressure of the gas in chamber 51 reaches or exceeds a predetermined and desired maximum, diaphragm 52 is flexed upwardly against the bias of spring 62, causing upward movement of stem 56 and counter-clockwise movement of lever 64 to cause at least a partial closing of inlet 49 by needle valve 50.

As noted above, gas flows out of pressure valve 42 (Figure 6) by way of discharge 41, thence through pipe 40 into automatic shut-off valve 38. As is best shown in Figure 8, valve 38 comprises a body portion 67 provided with a chamber 68, which communicates with discharge 37 (see also Figure 6) by way of a valve closed bore 69. A dome 70 is bolted to the top of valve body 67, the dome and body being sealed by a gasket 71 disposed therebetween. A solenoid (not shown) is operatively disposed in dome 70 and is energized by a thermo-couple 72 (Figure 7) which is connected to the solenoid by a conductor 73 (see Figure 5). A fuller description of the position and purpose of thermo-couple 72 will be set forth hereinbelow.

A seat portion 74 (Figure 8) is formed in the bottom of valve chamber 68 around bore 69, this seat portion and bore being concentric with a hole 75 formed in valve body 67 and communicating with bore 69. A valve stem 76 extends through hole 75 and bore 69, and has secured thereto a guide 77 which reciprocates in bore 69 as the valve is actuated. A gate 78 is secured to the upper end of valve stem 76 and, with a disc 79, seats against valve seat 74 upon downward movement of stem 76 to shut off communication between valve chamber 68 and discharge 37 by way of bore 69. The lower part of stem 76 extends through valve body 67 so that portion 76a thereof lies outside of the valve. A bellows 80 surrounds the exposed portion 76a of stem 76 and has its upper end 80a connected to valve body 67 and its lower end 80b connected to a push button 81 against which the bottom 76a of the valve stem rests. Preferably bellows 80 is enclosed within a suitable guard or casing 81a. A spring 82 is disposed between the bottom surface of dome 70 and the upper surface of disc 78 to constantly urge the valve disc downwardly on seat 74. Spring 82 preferably surrounds a plunger 140, which is connected to the armature of the solenoid in dome 70. Thus valve disc 78 may be lifted from seat 74 by upward pressure on valve stem 76 by push button 81. At the same time plunger 140 is forced upwardly against the bias of spring 82 and as the plunger is connected to the solenoid armature, it is maintained in this position wherein it holds the valve open when the solenoid is energized. When valve gate 78 is so lifted, gas may flow from chamber 68 through bore 69 into discharge 37 and thence into a receiving chamber 83 formed in inlet end 36 of control valve 35.

Control valve 35 operates in response to thermostat 21 (Figure 1) which as noted above communicates with the control valve by way of pipe 22 (Figure 5). Referring again to Figure 8, pipe 22 is connected to an upper chamber 84 of valve 35, this chamber being a pressure chamber in which the pressure tends to collapse a bellows 85 to force downwardly a stem 86 against the action of a spring 87 and a spring 88. Stem 86 is operatively connected at its lower end to an arm 89 loosely pivoted between a pair of screws 90 and 91. The right-hand end of arm 89, as viewed in Figure 8, is connected to a snap spring 92, which is in turn connected to the lower end of a needle valve 93, whose needle portion 93a is positioned to seat in a bore 94 formed in discharge end 34 of the control valve. Bore 94 communicates with receiving chamber 83 of the valve, and accordingly gas flowing thereinto from discharge 37 of shut-off valve 38 may flow therefrom, when needle valve 93 is unseated, into and through pipe 33 to burner 32 (see Figures 5, 6 and 7). It may now be seen that according to the dictates of thermostat 21, which as noted above responds to the temperature inside car 10, needle valve 93 is seated or unseated to prevent or permit gas flow to burner 32.

Receiving chamber 83 is also provided with another gas outlet or discharge 95, which connects with a pipe 96 (Figure 6) through which gas may flow to a pilot light 97 (Figure 7) for burner 32. Pilot 97 is preferably in the form of a torus through which thermo-couple 72 extends. Thus, as long as pilot 97 is burning, thermo-couple 72 is heated and current can flow to the solenoid in dome 70 (Figure 8) of shut-off valve 38 by way of conductor 73. However, if pilot 97 is blown out or becomes extinguished for any reason, thermo-couple 72 cools and the solenoid in shut-off valve 38 becomes de-energized to permit spring 82 to force valve gate 78 down on its seat 74 thus preventing flow of gas into receiving chamber 83 of control valve 35. Thus gas is prevented from flowing out of pilot discharge 95 or burner discharge 34, and all danger of explosion is precluded.

Referring now to Figures 2, 3 and 4, in which I show the provisions for air inlet and exhaust gas outlet, insulating walls 27 (Figure 2) which form enclosure 26, also form with adjacent walls of casing 25 air passages or chambers 98, 99, 100 and 101, as will be more fully described below. As may be seen from Figure 7, air passage 101 houses most of the controlling valves for the heater as heretofore described. Air chambers 98 and 100 (Figure 2) are substantially similar, and accordingly but one of them will be described hereinafter.

Referring to Figures 2 and 3, air chamber 98 has disposed therein an elongated hood or U-shaped partition 102, the upper portion 103 of which encircles an opening 104 formed in the wall of casing 25. Partition 102 preferably extends down to and is secured to the bottom wall 25a (Figure 3) of casing 25, the lower edges of the partition being secured along opposite edges of an opening 105 formed in casing bottom 25a. Opening 105 may be closed by a closure plate 106, which is held in place by a nut 107 threaded to a stud 108 secured to a plate 109. Thus opening 105 provides a convenient clean-out opening for the space enclosed by partition 102. Hood 102 accordingly forms an air passage 110 within air chamber 98 in communication with the atmosphere by way of casing opening 104 and in communication with air chambers 98 by way of a number of holes 112 formed in the lower portions of partition 110. A hood or cowl 111 (Figures 2 and 4) partially encircles air inlet 104 to prevent cross currents of air from causing a vacuum in air passage 110.

A pair of partitions 113 and 114 (Figure 3) separate air chamber 98 from air chambers 99 and 101 respectively and accordingly act as baffles to cause air flowing from partition openings 112 to pass upwardly through chamber 98 before flowing into chambers 99 and 101. As shown in Figure 7, insulating walls 27 do not extend to the bottom of the casing 25 and accordingly, with reference to Figures 2 and 3, the air is free to flow from air chambers 99 and 101 under walls 27 and into the space below burner 32 (Figure 7). Thereafter burner 32 heats the air which rises past water heater 28 and, as shown in Figure 3, is exhausted through exhaust ports generally indicated at 115 and 116. The upper portion of casing 25 (Figure 3) over heater enclosure 26 is provided with a sheet of heat insulating material 117 directly under the top wall of the casing which is secured to the bottom of car 10.

The upper part of enclosure 26 (Figure 3) communicates with exhaust ports 115 and 116 by way of openings 118 and 119 respectively, opening 118 communicating with an exhaust chamber 119 having a bottom plate 120 inclined to permit moisture drainage. Similarly, opening 119 communicates with an exhaust chamber 121 having an inclined drainage plate 122. Exhaust chamber 121, however, has a relatively narrow and elongated exhaust port 122 (see Figures 1 and 4) this exhaust being so shaped as it is positioned almost directly under the side of car 10, where it receives the full force of cross currents of wind. The small size of exhaust 123 prevents such cross currents from rushing through exhaust chamber 121 into heater enclosure 26 where they might disturb or extinguish the flame in burner 32. As exhaust chamber 119 is more or less protected by various fixtures beneath car 10, it is not necessary to restrict the size of the opening of this chamber which accordingly opens directly to the atmosphere.

To permit ready access to the interior of heater 11, I provide a door 124 hingedly supported on the exposed side of heater 11. If desired, a latch 125 may be used with a padlock for locking the door.

As pointed out above with respect to Figure 2, air chamber 100 is substantially similar to air chamber 98, and is accordingly provided with a hood or partition 126. This hood forms with a pair of partitions 127, similar to partitions 114, a tortuous air passage between an inlet 128 in the casing wall adjacent the upper portion of the hood and the openings in the bottom of air chambers 99 and 101. Air inlet 128 is also provided with an air shield or cowl 129 similar to cowl 111. Thus when heater 11 is positioned beneath car 10, one of openings 104 or 128 will be facing the direction of movement of the car and accordingly air is forced through one or the other of the above-described tortuous passages to the burner and thence out through exhausts 123 and 119. It should also be noted that by arranging exhausts 119 and 123 parallel with the sides of the car, movement of the car in either direction of travel causes a certain amount of suction at the exhausts to increase the normal amount of draught.

It will now appear that heater 11 is provided with tortuous paths through which the inlet air must flow to the heater and with well protected exhausts which dissipate the products of combustion of the heater without endangering the car or permitting the flame in the heater to be blown out. Thus the heater can operate efficiently at all times in response to the temperature needs within the car and so maintain the conditions desired therein. Further, by placing heating pipes 15 and 16 in the floor of the car and by hanging heater 11 outside of and beneath the car, all storage space within the car may be used for cargo and the heater is easily accessible at all times from without the car.

I have thus provided a heating system and a heater therefor which efficiently heats a railroad car or the like and thus attains the several objects set forth hereinabove in a thoroughly practical manner.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In car heating apparatus, in combination, a casing to be mounted upon the car, said casing having two longitudinal side walls extending in the direction of the car movement and two transverse side walls, an air inlet port on each of said transverse side walls and an air exhaust port on each of said longitudinal side walls, each of said exhaust ports having an outwardly diverging outlet and one of said ports having an overhanging lip along the lower edge of its outlet opening, a combustion chamber in said casing having sides juxtaposed to and spaced from the sides of said casing to form air spaces, baffle means positioned to form a tortuous path from each of said air inlet ports to the bottom of said combustion chamber, and means directing the gases from the top of said combustion chamber through said exhaust ports.

2. In car heating apparatus, in combination, a casing to be mounted upon the car, said casing having two longitudinal side walls extending in the direction of the car movement and two transverse side walls, an air inlet port on each of said transverse side walls and an air exhaust port on each of said longitudinal side walls, each of said exhaust ports having an outwardly diverging outlet and one of said ports having an overhanging lip along the lower edge of its outlet opening and being substantially smaller than the other exhaust port, each of said exhaust ports having a bottom wall which extends downwardly and outwardly, a combustion chamber in said casing having sides juxtaposed to and spaced from the sides of said casing to form air spaces, baffle means positioned to form a tortuous path from each of said air inlet ports to the bottom of said combustion chamber, and means directing the gases from the top of said combustion chamber through said exhaust ports.

3. In car heating apparatus, in combination, a casing to be mounted upon the car, and a combustion chamber centrally positioned within said casing, said casing having two longitudinal side walls extending substantially in the direction of car movement and transverse side walls, means forming an air inlet port on each of said transverse side walls, and means forming an air exhaust port at the upper portion of each of said longitudinal side walls, one of said last-named means comprising a substantially horizontal upper wall and a downwardly and outwardly extending bottom wall spaced therefrom and extending outwardly beyond the edge of its longitudinal side wall to form an overhanging lip, said substantially horizontal wall and said bottom wall forming an outwardly diverging duct with its inner end connected to receive gases from the upper central portion of said casing at the top of said combustion chamber and its outer end connected to deliver gases to the atmosphere through an opening extending along said overhanging lip.

JOHN RUMPF.